(12) United States Patent
Manabe

(10) Patent No.: US 12,282,113 B2
(45) Date of Patent: Apr. 22, 2025

(54) RADAR SYSTEM, RADAR DEVICE, AND MONITORING METHOD

(71) Applicant: HITACHI KOKUSAI ELECTRIC INC., Tokyo (JP)

(72) Inventor: Ryotaro Manabe, Tokyo (JP)

(73) Assignee: KOKUSAI DENKI ELECTRIC INC., Tokyo (JP)

( * ) Notice: Subject to any disclaimer, the term of this patent is extended or adjusted under 35 U.S.C. 154(b) by 0 days.

(21) Appl. No.: 18/293,954

(22) PCT Filed: Aug. 25, 2021

(86) PCT No.: PCT/JP2021/031088
§ 371 (c)(1),
(2) Date: Jan. 31, 2024

(87) PCT Pub. No.: WO2023/026384
PCT Pub. Date: Mar. 2, 2023

(65) Prior Publication Data
US 2024/0264273 A1    Aug. 8, 2024

(51) Int. Cl.
*G01S 7/40*         (2006.01)
*G01S 13/32*        (2006.01)
*G01S 13/87*        (2006.01)

(52) U.S. Cl.
CPC .......... *G01S 7/4004* (2013.01); *G01S 13/32* (2013.01); *G01S 13/87* (2013.01)

(58) Field of Classification Search
CPC ...... G01S 13/931; G01S 13/87; G01S 13/003; G01S 2013/0245; G01S 2013/93271;
(Continued)

(56) References Cited

U.S. PATENT DOCUMENTS 11,815,619 B1 *  11/2023  Shoemaker ............... G01S 7/03
2005/0057206 A1 *  3/2005  Uneyama ................ F16P 3/147
                                                     318/365
(Continued)

FOREIGN PATENT DOCUMENTS

CN        111443348 A        7/2020
EP        3505952 A1 *       7/2019   ........... G01S 13/931
(Continued)

OTHER PUBLICATIONS

International Search Report dated Oct. 26, 2021, with translation.

*Primary Examiner* — Olumide Ajibade Akonai
(74) *Attorney, Agent, or Firm* — BACON&THOMAS,PLLC

(57) ABSTRACT

In this example, a radar system is such that normally, each of a plurality of radar devices 100-1 to 100-6 monitors the monitoring area for the same using a radar signal that has been frequency modulated within a first modulation band, and when one of the plurality of radar devices 100-1 to 100-6 fails, at least one radar device (for example, radar device 100-1) adjacent to the radar device (for example, radar device 100-2) that has failed monitors the monitoring area of the radar device that has failed using a radar signal that has been frequency modulated within a second modulation band that is narrower than the first modulation band. As a result, even if one of the radar devices fails, it is possible to continue monitoring the monitoring area of the radar device.

4 Claims, 7 Drawing Sheets

(58) Field of Classification Search
CPC .......... G01S 7/032; G01S 2013/93272; G01S 2013/93274; G01S 7/4091; G01S 13/872; G01S 7/4008; G01S 7/4004; G01S 7/4017; G01S 7/282; G01S 7/285; G01S 2013/93275; G01S 13/343; G01S 13/89; H01Q 21/061; H01Q 21/0025; H01Q 1/3233
See application file for complete search history.

(56) References Cited

U.S. PATENT DOCUMENTS

| | | |
|---|---|---|
| 2011/0058581 A1 | 3/2011 | Nobis et al. |
| 2015/0153445 A1* | 6/2015 | Jansen .................... G01S 7/032 |
| | | 342/195 |
| 2017/0280110 A1 | 9/2017 | Kondo et al. |
| 2019/0293784 A1* | 9/2019 | Khalid .................... G01S 13/87 |
| 2020/0158863 A1* | 5/2020 | Hohla .................... G01S 13/878 |
| 2021/0190932 A1 | 6/2021 | Sato |
| 2021/0246708 A1* | 8/2021 | Mönig .................... B62D 33/03 |
| 2021/0349208 A1 | 11/2021 | Kuroda et al. |
| 2022/0003858 A1* | 1/2022 | Sahara ................. G01S 13/931 |

FOREIGN PATENT DOCUMENTS

| | | |
|---|---|---|
| JP | 2004-220224 A | 8/2004 |
| JP | 3613952 B2 * | 1/2005 |
| JP | 2014-062804 A | 4/2014 |
| KR | 10-1744692 B1 | 6/2017 |
| WO | 2018/235397 A1 | 12/2018 |
| WO | 2020/049892 A1 | 3/2020 |

* cited by examiner

RADAR SYSTEM, RADAR DEVICE, AND MONITORING METHOD

TECHNICAL FIELD

The present disclosure relates to a radar system that detect an object existing in a monitoring area using a radar device.

BACKGROUND

Conventionally, a frequency modulated continuous-wave (FMCW) radar device having a structure shown in FIG. 1 has been commercialized as a radar device using microwave or millimeter wave bands.

A radar device 100 shown in FIG. 1 amplifies a frequency-modulated radar signal from a FMCW transmission source 101 using a transmission power amplifier 103, and emits it from a transmission antenna 104. When an object T (reflecting object) exists in a detection area of the radar device 100, the radar transmission wave is reflected by the object T. The reflected wave from the object T is received by a reception antenna 105 of the radar device 100, and amplified by a reception power amplifier 106. Then, the reflected wave is mixed with a transmission radar signal component from a power divider 102 by a mixer 107, and converted to an IF signal. The IF signal outputted from the mixer 107 is subjected to A/D conversion and signal processing in a signal processing part 108. As a result, radar detection results such as the reflected reception power (reflected wave power) by the object T, the distance to the object T, the orientation of the object T, the speed (relative speed with respect to the radar device 100) obtained when the object T is moving, and the like are obtained.

Here, conventional techniques in the technical field related to the present disclosure may include the following techniques. For example, Patent Document 1 discloses an invention in which when a radar device detects an object in a monitoring area, a movement determination part determines whether or not the object is a moving body based on a radar detection result, and when the movement determination part determines that the object is the moving body, a stop controller performs control for temporarily stopping a radar operation of the radar device.

PRIOR ART DOCUMENTS

Patent Documents

International Publication No. 2018/235397

SUMMARY

Problems to be Resolved by the Disclosure

A radar device is used for detecting foreign objects falling on road surfaces such as airport runways or highways. In order to monitor such a wide area, it is common to install a plurality of radar devices and construct a radar system that aggregates detection results from the respective radar devices.

In the radar system for monitoring airport runways and highways, when one of the radar devices fails, an operation of replacing the failed radar device with a spare device is required for restoration. However, an operation on airport runways and highways is not easy, and time is required to complete the restoration work. As a result, even if a falling object exists in the monitoring area of the failed radar device, it is not detected for a long time, which disrupts a monitoring operation.

The present disclosure has been made in view of the above-described conventional circumstances, and an object of the present disclosure is to enable continuous monitoring of a monitoring area of any one of failed radar device.

Means for Solving the Problems

In order to achieve the above object, a radar system according to one aspect of the present disclosure is configured as follows.

In other words, a radar system including a plurality of radar devices is characterized in that, normally, each of the radar devices monitors its own monitoring area using a radar signal frequency modulated with a first modulation band, and when one of the radar devices fails, at least one radar device adjacent to the failed radar device monitors the monitoring area of the failed radar device using a radar signal frequency modulated with a second modulation band which is narrower than the first modulation band.

Here, in the radar system according to the present disclosure, when any of the radar devices fails, at least one radar device may be configured to transmit a radar signal frequency modulated with the first modulation band in a direction in which the monitoring area of the failed radar device does not exist in the sweeping range of the radar signal and to transmit a radar signal frequency modulated with the second modulation band in a direction in which the monitoring area of the failed radar device exists.

Further, in the radar system according to the present disclosure, when any of the radar devices fails, at least one radar device may be configured to transmit a radar signal frequency modulated with the second modulation band in the entire sweeping range of the radar signal.

Further, in the radar system according to the present disclosure, when any one of the radar devices fails, at least two radar devices adjacent to the failed radar device may be configured to alternately monitor the monitoring area of the failed radar device.

Further, a radar device according to one aspect of the present disclosure is configured as follows.

In other words, a radar device capable of changing a modulation band of a radar signal is characterized in that, normally, it monitors its own monitoring area using a radar signal frequency modulated with a first modulation band, and when an adjacent radar device fails, it monitors the monitoring area of the failed radar device using a radar signal frequency modulated with a second modulation band which is narrower than the first modulation band.

Further, a monitoring method according to one aspect of the present disclosure is configured as follows.

In other words, a monitoring method using a radar system including a plurality of radar devices is characterized in that, normally, each of the radar devices monitors its own monitoring area using a radar signal frequency modulated with a first modulation band, and when any of the multiple radar devices fails, at least one radar device adjacent to the failed radar device monitors the monitoring area of the failed radar device using a radar signal frequency modulated with the second modulation band which is narrower than the first modulation band.

Effect of the Invention

In accordance with the present disclosure, even when any one radar device fails, it is possible to continuously monitor the monitoring area of the failed radar device.

DETAILED DESCRIPTION

A radar system according to an embodiment of the present disclosure will be described with reference to the drawings.

Figure 1:
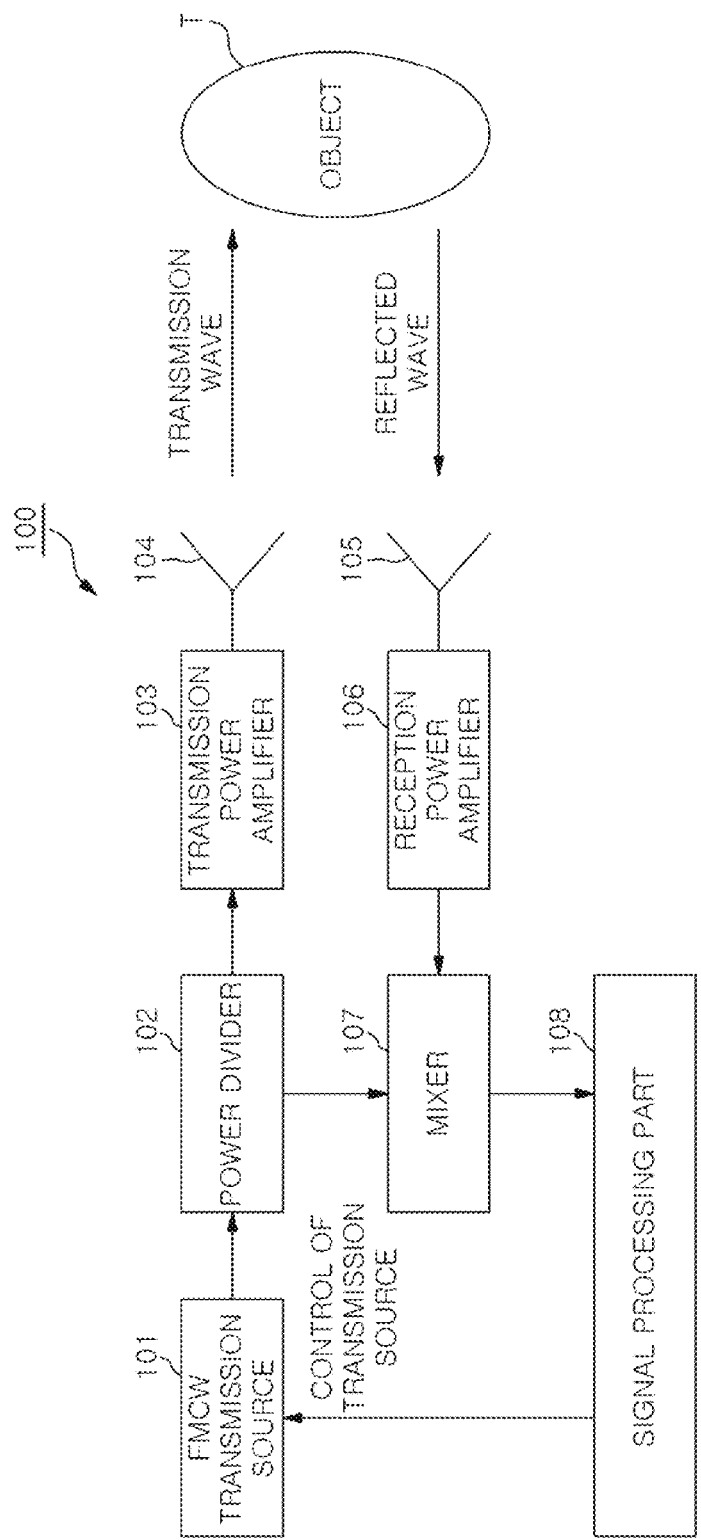
FIG. 1 shows an example of a configuration of a radar device.
Figure 2:
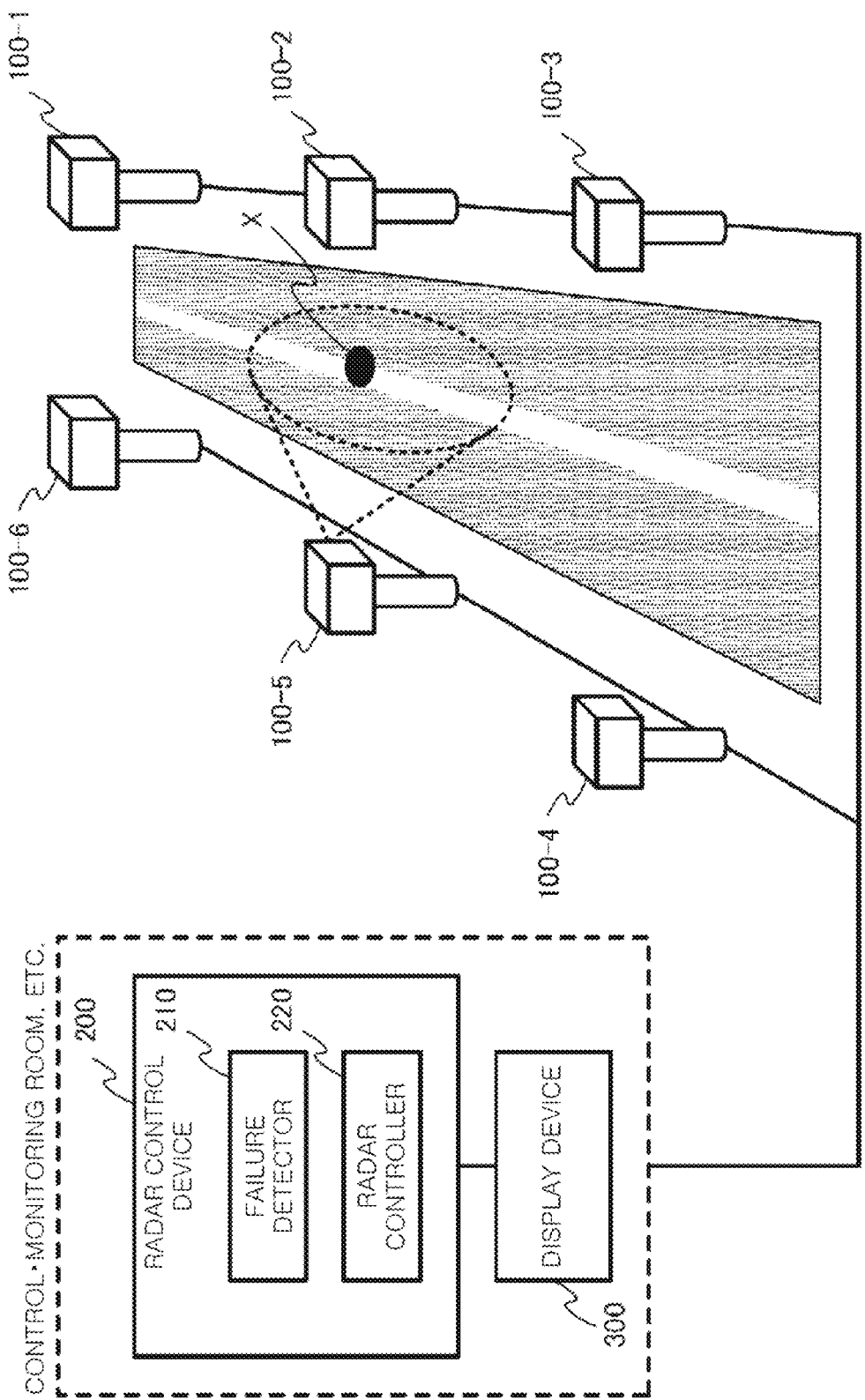
FIG. 2 shows an outline of a radar system according to an embodiment of the present disclosure.

FIG. 2 shows an outline of a radar system according to an embodiment of the present disclosure. The radar system of this example includes a plurality of radar devices 100 installed to face a road surface to be monitored (for example, an airport runway), and a radar control device 200 and a display device 300 installed in a control room or a monitoring room. The plurality of radar devices 100 and the radar control device 200 are connected to each other by optical fiber cables or the like. Although FIG. 2 shows six radar devices 100-1 to 100-6 installed on both sides of the road surface to be monitored so as to be parallel to the road surface, the number of the radar devices is arbitrary.

Figure 3:
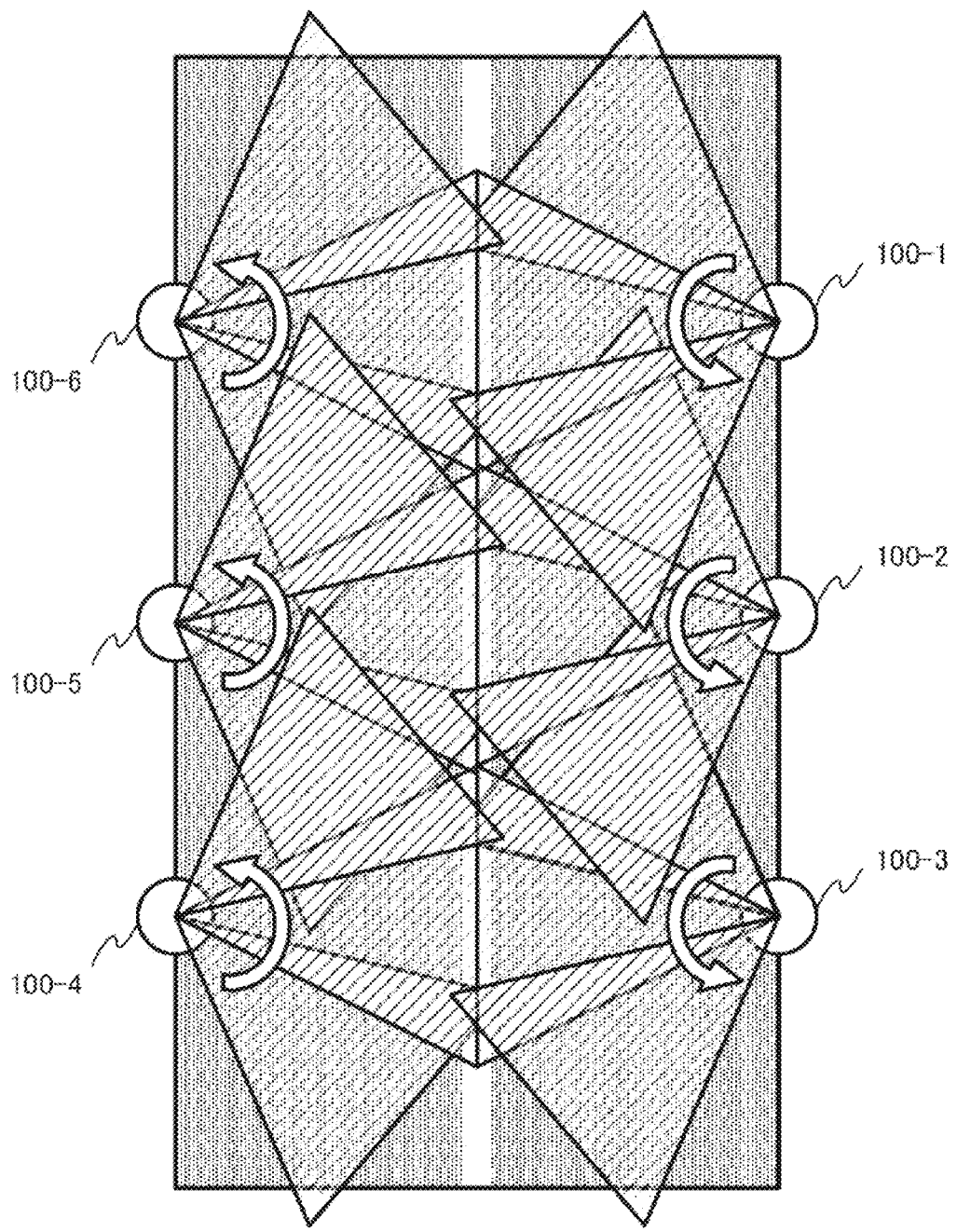
FIG. 3 shows a normal operation.

As shown in FIG. 3, each radar device 100 emits a radar signal to its own monitoring area and receives a reflected wave of the radar signal while rotating 360 degrees in a predetermined direction (for example, in a counterclockwise direction). The radar devices 100 transmit radar detection results obtained by performing signal processing on the reflected waves of the radar signals to radar control device 200. The radar control device 200 displays detection information (for example, the position, size, and shape of the object) of objects existing on the road surface to be monitored on the display device 300 based on the radar detection results received from the radar devices 100.

Further, each radar device 100 has a function of changing the modulation band of the radar signal under the control of the radar control device 200. In other words, the radar device 100 has a first operation mode in which a radar signal frequency modulated with a first modulation band is outputted from the FMCW transmission source 101, and a second operation mode in which a radar signal frequency modulated with a second modulation band narrower than the first modulation band is outputted from the FMCW transmission source 101, and can switch the operation mode in response to the control signal from the radar control device 200. Since the radar signal in the second modulation band reaches farther than the radar signal in the first modulation band, it is possible to monitor a wider area in the second operation mode than in the first operation mode.

The principle in which the monitoring area becomes wider by narrowing the modulation band will be explained.

A modulation bandwidth and a distance resolution are determined by the following relational expression.

$$d = c/2B \quad \text{(relational expression)}$$

Here, d denotes a distance resolution, c denotes a speed of light, and B denotes a modulation bandwidth. In other words, as the modulation bandwidth B becomes wider, the distance resolution d becomes finer, and as the modulation bandwidth B becomes narrower, the distance resolution d becomes coarser.

If the number of points that can be captured by the performance of the signal processing is set to N, the maximum distance that can be processed is calculated by multiplying the distance resolution d by the number of points N. Therefore, as the distance resolution d becomes finer (i.e., smaller), the maximum distance that can be processed becomes shorter. On the contrary, as the distance resolution d becomes coarser (i.e., larger), the maximum distance that can be processed becomes longer. For example, when the modulation band is 8 GHZ, the distance resolution is 0.01875 m, but when the modulation band is 4 GHZ (half of 8 GHZ), the distance resolution is 0.0375 m, which doubles the maximum distance that can be processed. Therefore, the monitoring area becomes wider by narrowing the modulation band.

The radar control device 200 includes a failure detector 210 for detecting failure of any one of the plurality of radar devices, and a radar controller 220 for controlling another radar device to monitor the monitoring area of the failed radar device. The radar control device 200 is, for example, a computer including hardware resources such as a processor, a memory, and the like, and is configured to realize the operations of the failure detector 210 and the radar controller 220 by executing a predetermined program.

The failure detector 210 can detect failure of the radar device in various manners. For example, when a signal indicating the occurrence of failure is received from a radar device, the failure detector 210 can determine that the radar device has failed. For another example, when the communication with a radar device is interrupted, the failure detector 210 can determine that the radar device has failed.

When failure of a radar device is detected by the failure detector 210, the radar controller 220 outputs a control signal for controlling an operation of a radar device adjacent to the failed radar device in order to continuously monitor the monitoring area of the failed radar device. For example, when the radar device 100-2 fails, radar control device 200 outputs a control signal for controlling an operation of at least one of the radar device 100-1 and the radar device 100-3 adjacent to the radar device 100-2 in order to continuously monitor the monitoring area of the radar device 100-2.

Here, the radar controller 220 can specify a radar device adjacent to the failed radar device in various manners. For example, the radar controller 220 can store the data that associates each of a plurality of radar devices with a radar device adjacent to the radar device in the memory in advance and specify a radar device adjacent to the failed radar device based on the data. For another example, the radar controller 220 can store position data (latitude and longitude) of each of the plurality of radar devices in advance in the memory, and calculate a distance from the failed radar device to each radar device based on the data in order to specify a radar device adjacent to the failed radar device in an ascending of the distance.

The radar controller 220 controls the monitoring area of the radar device adjacent to the failed radar device to be partially or entirely expanded in order to continue monitoring of the failed radar device. Hereinafter, this will be described in detail with reference to FIGS. 4 to 7.

Figure 4:
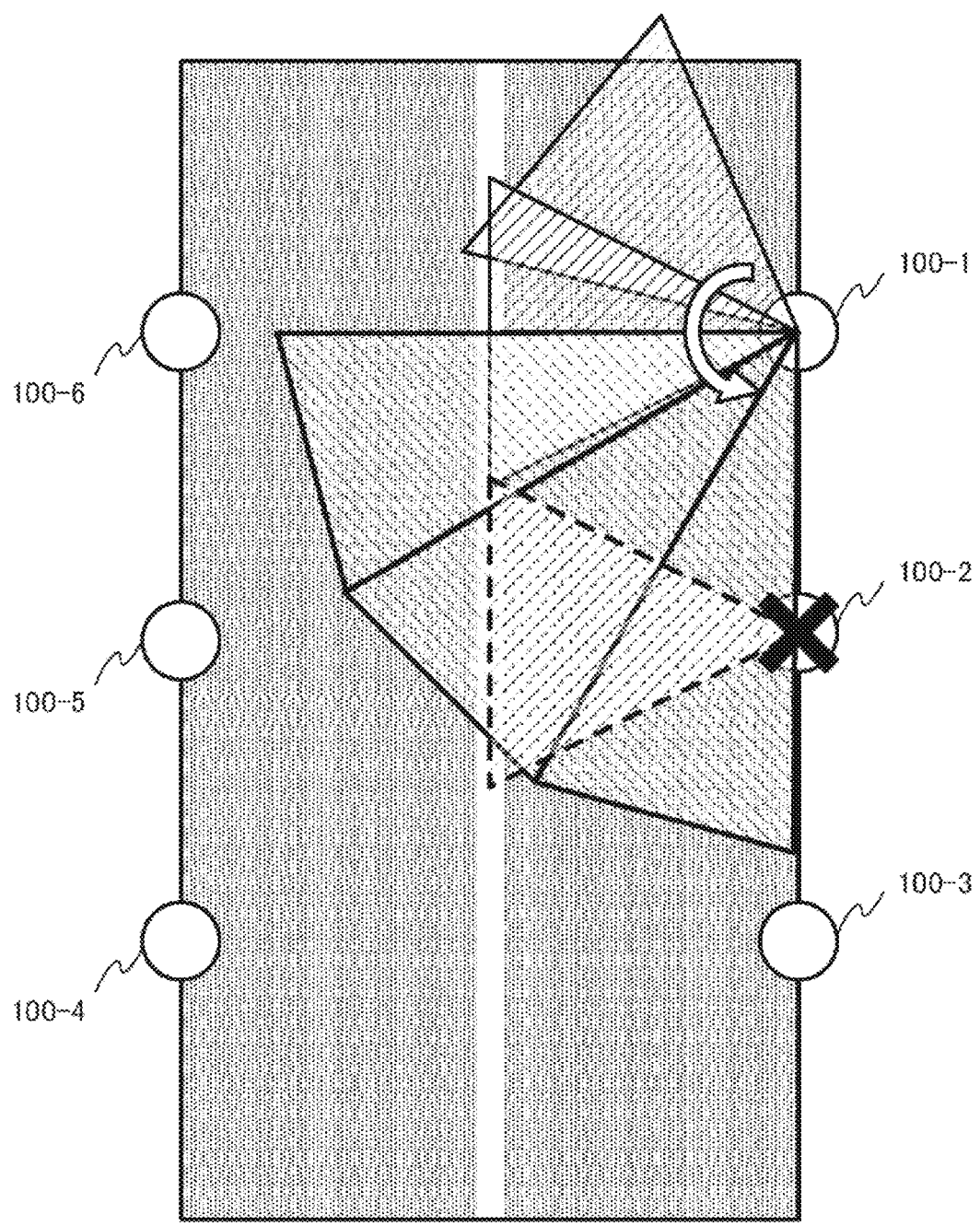
FIG. 4 shows a first control example in the case of detecting failure of the radar device.

FIG. 4 shows a first control example in the case detecting failure of the radar device 100-2. In the first control example, the monitoring area of the radar device 100-1 on the right side of the radar device 100-2 that has failed is partially expanded so that the monitoring area of the radar device 100-2 can be monitored by the radar device 100-1. In this example, the arrival distance of the radar signal is increased by narrowing the modulation band of the radar signal compared to that in a conventional case. In other words, when the normal modulation band is set to a first modulation band, if an adjacent radar device fails, the monitoring area is expanded by emitting a radar signal frequency modulated with the second modulation band narrower than the first modulation band.

In the example of FIG. 4, the radar device 100-1 transmits a radar signal frequency modulated with the first modulation band in a direction in which the monitoring area of the radar device 100-2 that has failed does not exist in the sweeping range of the radar signal, and transmits a radar signal frequency modulated with the second modulation band in a direction in which the monitoring area of the failed radar device 100-2 exists. Accordingly, the radar device 100-1 can allow a radar signal to reach the monitoring area of the failed radar device 100-2. Hence, the radar device 100-1 can monitor the monitoring area of the radar device 100-2 as well as its own monitoring area.

Figure 5:
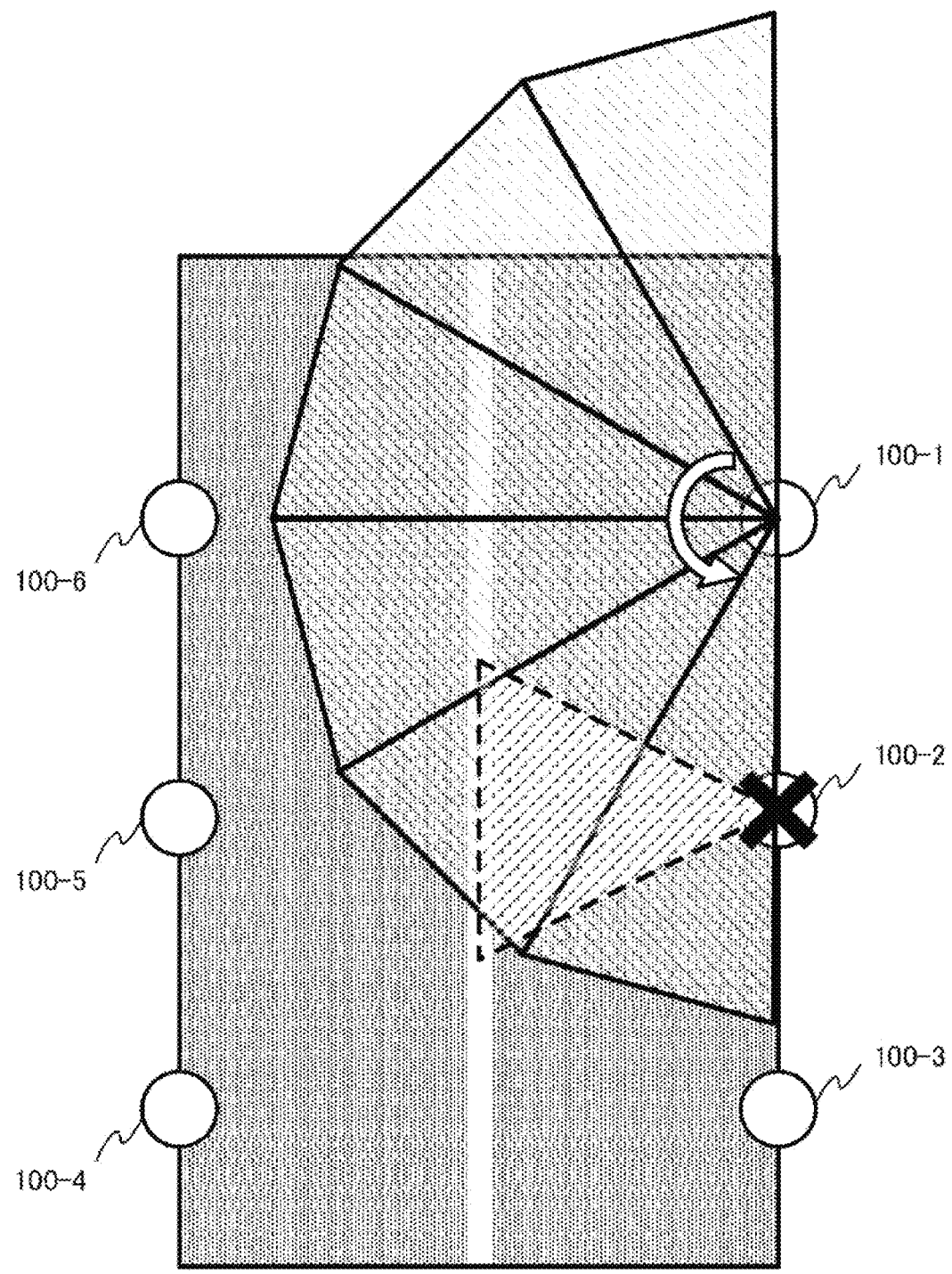
FIG. 5 shows a second control example in the case of detecting failure of the radar device.

FIG. 5 shows a second control example in the case of detecting failure of the radar device 100-2. In the second control example, the monitoring area of the radar device 100-1 on the right side of the failed radar device 100-2 is entirely expanded so that the monitoring area of the radar device 100-2 can be monitored by the radar device 100-1. In other words, the radar device 100-1 transmits a radar signal frequency modulated with the second modulation band in the entire sweeping range of the radar signal. In this case as well, the radar device 100-1 can allow the radar signal to reach the monitoring area of the failed radar device 100-2, and thus can monitor the monitoring area of the radar device 100-2 as well as its own monitoring area.

Figure 6:
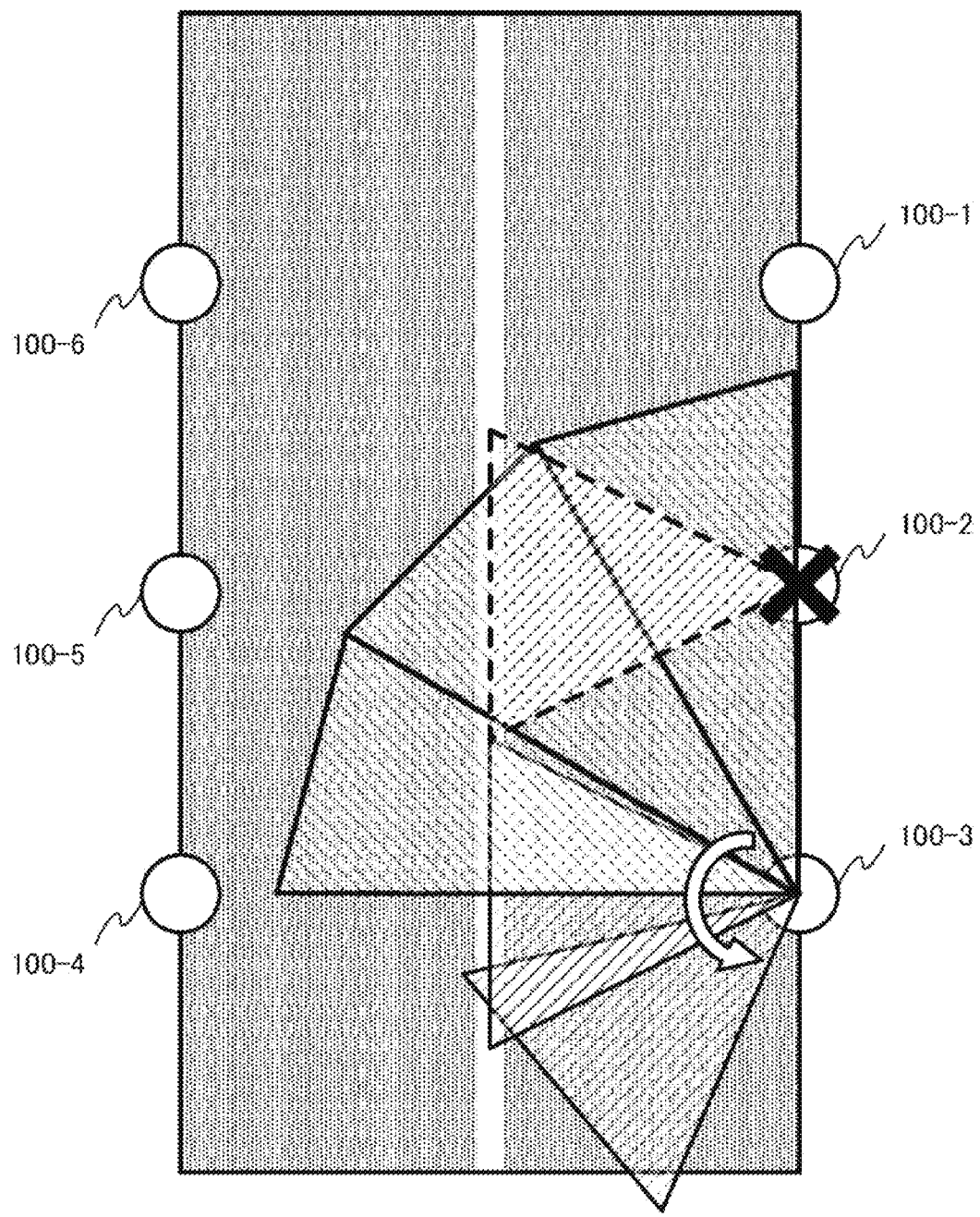
FIG. 6 shows a third control example in the case of detecting failure of the radar device.

FIG. 6 shows a third control example in the case of detecting failure of the radar device 100-2. In the third control example, the monitoring area of the radar device 100-2 on the left side of the failed radar device 100-2 is partially expanded so that the monitoring area of radar device 100-2 can be monitored. Specifically, the radar device 100-3 transmits a radar signal frequency modulated with the first modulation band in a direction in which the monitoring area of the failed radar device 100-2 does not exist in the sweeping range of the radar signal, and transmits a radar signal frequency modulated with the second modulation band in a direction in which the monitoring area of the failed radar device 100-2 exists. Accordingly, the radar device 100-3 can monitor the monitoring area of the radar device 100-2 as well as its own monitoring area.

Figure 7:
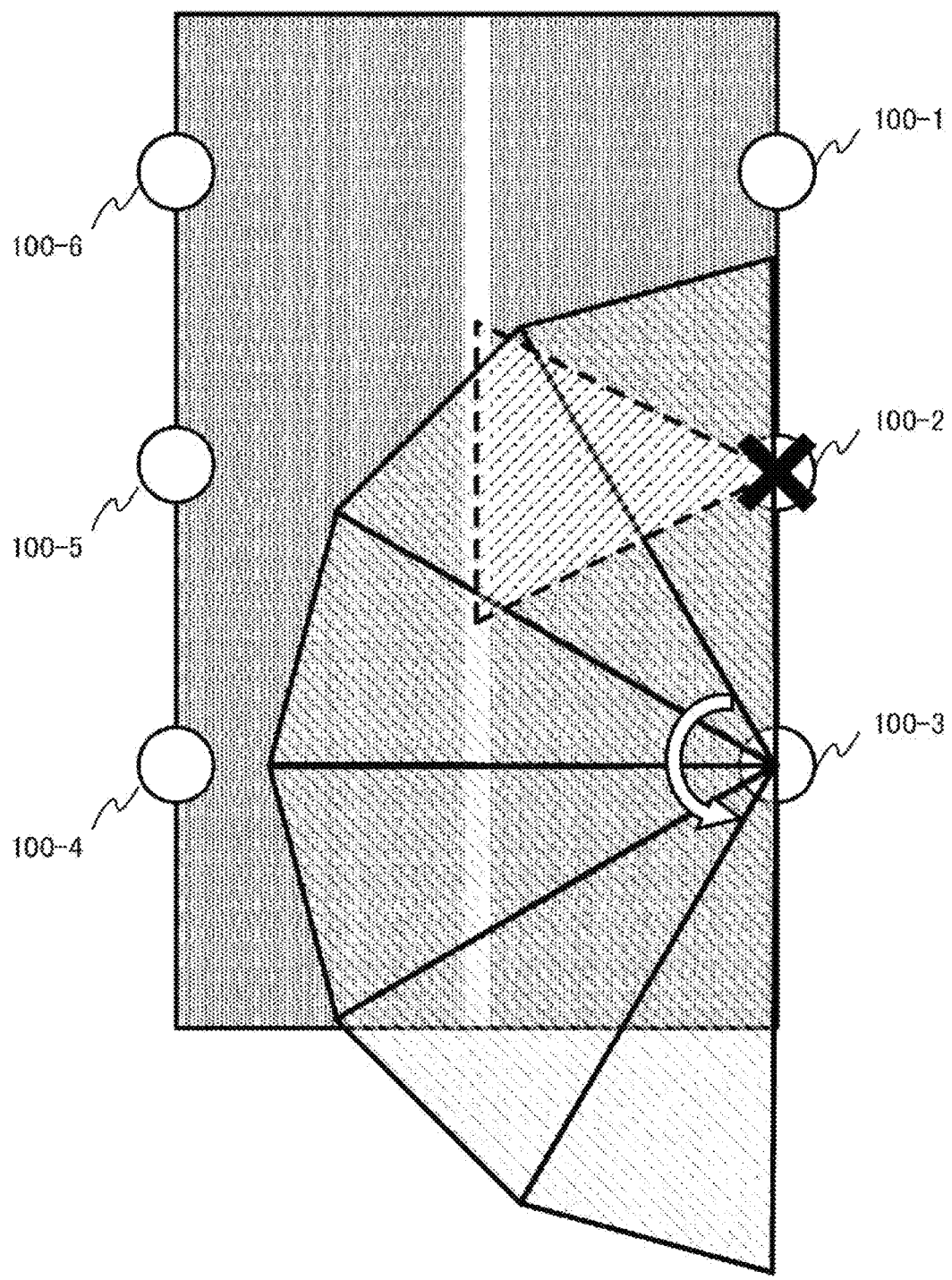
FIG. 7 shows a fourth control example in the case of detecting failure of the radar device.

FIG. 7 shows a fourth control example in the case of detecting failure of the radar device 100-2. In the fourth control example, the monitoring area of the radar device 100-2 on the left side of the failed radar device 100-2 is entirely expanded so that the monitoring area of the radar device 100-2 can be monitored. In other words, the radar device 100-3 transmits a radar signal frequency modulated with the second modulation band in the entire sweeping range of the radar signal. In this case as well, the radar device 100-3 can allow the radar signal to reach the monitoring area of the failed radar device 100-2, and thus can cover the monitoring area of the radar device 100-2 as well as its own monitoring area.

Here, in the first control example to the fourth control example shown in FIGS. 4 to 7, when the radar device 100-2 fails, the monitoring area of the radar device 100-1 or the radar device 100-3 adjacent to the radar device 100-2 was expanded. However, it is also possible to expand the monitoring areas of both the radar device 100-1 and the radar device 100-3. In other words, the radar device 100-1 and the radar device 100-3 on both sides of the failed radar device 100-2 may alternately monitor the monitoring area of the radar device 100-2. Further, the radar device 100-5 located in front of the radar device 100-2 across the road surface to be monitored may monitor the monitoring area of the radar device 100-2, instead of the radar devices 100-1 and 100-3, or together with the radar devices 100-1 and 100-3.

As described above, the radar system of this example is configured such that, normally, each of the plurality of radar devices 100-1 to 100-6 monitors its own monitoring area using a radar signal frequency modulated with the first modulation band, and when any of the plurality of radar devices 100-1 to 100-6 fails, at least one radar device (e.g., the radar device 100-1 adjacent to the failed radar device (e.g., the radar device 100-2) monitors the monitoring area of the failed radar device using a radar signal frequency modulated with the second modulation band narrower than the first modulation band.

Therefore, even if one of the radar devices fails, it is possible to continuously monitor the monitoring area of the failed radar device. Accordingly, the radar system can continuously operate even before the failed radar device is restored. Further, it is unnecessary to immediately replace a radar device on airport runways, and an operation plan becomes easier, which is advantageous in terms of safety and cost.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

Further, the present disclosure can be provided as apparatuses exemplified in the above description, or as a system including such apparatuses, and can also be provided as a method executed by such apparatuses, a program for causing a processor to execute the functions of such apparatuses, a storage medium storing such a program in a computer-readable manner, or the like.

INDUSTRIAL APPLICABILITY

The present disclosure can be used for a radar system for detecting an object existing in a monitoring area using a radar device.

DESCRIPTION OF REFERENCE NUMERALS

100: radar device, 101: FMCW transmission source, 102: power divider, 103: transmission power amplifier, 104: transmission antenna, 105: reception antenna, 106: reception power amplifier, 107: mixer, 108: signal processing part, 200: radar control device, 210: failure detector, 220: radar controller, 300: display device

The invention claimed is:

1. A radar system, comprising:
a plurality of radar devices; and
a radar controller,
wherein the radar controller includes a processor and a memory storing instructions therein, the instructions, when executed by the processor, causing the processor to:
detect a failure of each of the plurality of radar devices;
if no failure is detected, control each of the plurality of radar devices to monitor its respective monitoring area using a radar signal frequency modulated with a first modulation band;
if failure is detected in any of the plurality of radar devices, control at least one radar device adjacent to the failed radar device to:
transmit a radar signal frequency modulated with the first modulation band for a first portion of its monitoring area that does not overlap with the monitoring area of the failed radar device; and
transmit a radar signal frequency modulated with a second modulation band for a second portion of its monitoring area that overlaps with the monitoring area of the failed radar device.

2. The radar system of claim 1, wherein if failure is detected in any one of the plurality of radar devices, at least two radar devices adjacent to the failed radar device alternately monitor the monitoring area of the failed radar device.

3. A radar device configured to change a modulation band of a radar signal,
wherein, the radar device monitors its respective monitoring area using a radar signal frequency modulated with a first modulation band, and
in response to a determination that an adjacent radar has failed, the radar device transmits a radar signal frequency modulated with the first modulation band for a first portion of its monitoring area that does not overlap with the monitoring area of the failed radar device, and transmits a radar signal modulated with a second modulation band for a second portion of its monitoring area that overlaps with the monitoring area of the failed radar device.

4. A monitoring method using a radar system including a plurality of radar devices, the monitoring method comprising steps of:
detecting a failure of each of the plurality of radar devices;
if no failure is detected, controlling each of the plurality of radar devices to monitor its respective monitoring area using a radar signal frequency modulated with a first modulation band;
if failure is detected in any one of the plurality of radar devices, controlling at least one radar device adjacent to the failed radar device to:
transmit a radar signal frequency modulated with the first modulation band for a first portion of its monitoring area that does not overlap with the monitoring area of the failed radar device; and
transmit a radar signal frequency modulated with a second modulation band for a second portion of its monitoring area that overlaps with the monitoring area of the failed radar device.

* * * * *